United States Patent
Baboval et al.

(10) Patent No.: US 11,157,299 B2
(45) Date of Patent: Oct. 26, 2021

(54) THIN PROVISIONING VIRTUAL DESKTOP INFRASTRUCTURE VIRTUAL MACHINES IN CLOUD ENVIRONMENTS WITHOUT THIN CLONE SUPPORT

(71) Applicant: Citrix Systems, Inc., Fort Lauderdale, FL (US)

(72) Inventors: John Baboval, Burlington, MA (US); Thomas Goetz, Burlington, MA (US); Simon P. Graham, Burlington, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 218 days.

(21) Appl. No.: 15/677,727

(22) Filed: Aug. 15, 2017

(65) Prior Publication Data
US 2019/0056966 A1    Feb. 21, 2019

(51) Int. Cl.
| | |
|---|---|
| G06F 9/455 | (2018.01) |
| G06F 3/06 | (2006.01) |
| G06F 16/22 | (2019.01) |
| H04L 29/08 | (2006.01) |

(52) U.S. Cl.
CPC ........ *G06F 9/45558* (2013.01); *G06F 3/0604* (2013.01); *G06F 3/067* (2013.01); *G06F 3/0665* (2013.01); *G06F 16/2255* (2019.01); *G06F 16/2282* (2019.01); *H04L 67/1097* (2013.01); *G06F 3/0641* (2013.01); *G06F 2009/4557* (2013.01); *G06F 2009/45583* (2013.01); *G06F 2009/45595* (2013.01)

(58) Field of Classification Search
CPC .................................................. G06F 3/0644
See application file for complete search history.

(56) References Cited

U.S. PATENT DOCUMENTS

| | | | |
|---|---|---|---|
| 9,438,618 B1 * | 9/2016 | Sultan | H04L 63/1433 |
| 2010/0198972 A1 | 8/2010 | Umbehocker | |
| 2011/0238969 A1 * | 9/2011 | Warkentin | G06F 9/4416 |
| | | | 713/2 |

(Continued)

FOREIGN PATENT DOCUMENTS

| | | |
|---|---|---|
| JP | 2007243730 A | 9/2007 |
| JP | 2007323354 A | 12/2007 |
| JP | 2012073999 A | 4/2012 |

OTHER PUBLICATIONS

Notice of Reasons for Refusal issued in JP 2020-508503 dated Jul. 6, 2021.

*Primary Examiner* — Eric C Wai
(74) *Attorney, Agent, or Firm* — Fox Rothschild LLP; Robert J. Sacco; Carol E. Thorstad-Forsyth (57) ABSTRACT

Systems and methods for operating a cloud based computing system. The methods comprise: receiving, by a cloud server, a request for accessing Virtual Hard Disk ("VHD") data associated with a first location in the VHD of a Virtual Machine ("VM") hosted by a remote computing device; extracting, by the cloud server, at least a first address specifying the first location from the request; translating, by the cloud server, the first address into a second address specifying a second location in a cloud storage where the VHD data is stored; and communicating from the cloud server the second address to the remote computing device for facilitating access to the VHD data stored in the cloud storage.

23 Claims, 10 Drawing Sheets

(56) References Cited

U.S. PATENT DOCUMENTS

| | | | |
|---|---|---|---|
| 2012/0060153 A1* | 3/2012 | Bealkowski | G06F 9/45558 718/1 |
| 2012/0089781 A1* | 4/2012 | Ranade | H04L 67/1097 711/118 |
| 2014/0281350 A1 | 9/2014 | Lango et al. | |
| 2014/0324793 A1* | 10/2014 | Glazemakers | G06F 3/0641 707/692 |
| 2016/0283126 A1 | 9/2016 | Bhagwat et al. | |
| 2019/0087116 A1* | 3/2019 | Tsuda | G06F 3/0644 |

* cited by examiner

Page Table 126

| Row Identifier ("ID") | VHD Version ID | VHD Logical Block Address ("LBA") | Hash Table Row ("HTR") ID |
|---|---|---|---|
| Row ID $602_1$ | VHD Version ID $502_1$ | VHD LBA $604_1$ | HTR ID $606_1$ |
| Row ID $602_2$ | VHD Version ID $502_2$ | VHD LBA $604_2$ | HTR ID $606_2$ |
| ---- | ---- | ---- | ---- |
| Row ID $602_N$ | VHD ID $502_N$ | VHD LBA $604_N$ | HTR ID $606_N$ |

FIG. 6

Virtual Hard Disk ("VHD") Table 124

| VHD Version Identifier ("ID") | Parent VHD ("PVHD") ID | VHD Metadata |
|---|---|---|
| VHD Version ID $502_1$ | PVHD ID $504_1$ | VHD Metadata $506_1$ |
| VHD Version ID $502_2$ | PVHD ID $504_2$ | VHD Metadata $506_2$ |
| ---- | ---- | ---- |
| VHD Version ID $502_N$ | PVHD ID $504_N$ | VHD Metadata $506_N$ |

FIG. 5

Storage Object Table 130

| ACSP ID | Cloud Storage Access Info. ("CSAI") |
|---|---|
| ACSP ID $704_1$ | CSAI $802_1$ |
| ACSP ID $704_2$ | CSAI $802_2$ |
| ---------- | ---------- |
| ACSP ID $704_N$ | CSAI $802_N$ |

FIG. 8

Hash Table 128

| Hash Table Row ("HTR") Identifier ("ID") | Hash Value ("HV") | Addressable Cloud Storage Pool ("ACSP") ID | ACSP Offset Value ("OV") |
|---|---|---|---|
| HTR ID $606_1$ | HV $702_1$ | ACSP ID $704_1$ | ACSP OV $706_1$ |
| HTR ID $606_2$ | HV $702_2$ | ACSP ID $704_2$ | ACSP OV $706_2$ |
| ---------- | ---------- | ---------- | ---------- |
| HTR ID $606_N$ | HV $702_N$ | ACSP ID $704_N$ | ACSP OV $706_N$ |

THIN PROVISIONING VIRTUAL DESKTOP INFRASTRUCTURE VIRTUAL MACHINES IN CLOUD ENVIRONMENTS WITHOUT THIN CLONE SUPPORT

BACKGROUND

Statement of the Technical Field

The present disclosure relates generally to computing systems. More particularly, the present disclosure relates to implementing systems and methods for providing thin provisioning Virtual Desktop Infrastructure ("VDI") Virtual Machines ("VMs") in cloud environments without thin clone support.

DESCRIPTION OF THE RELATED ART

There are many cloud environments known in the art. One such cloud environment comprises Microsoft Azure. Storage provisioning in cloud environments (such as Microsoft Azure) has a number of drawbacks. For example, in the cloud environment, dynamic disks are not always supported, which means all blocks of a virtual disk (including unallocated space) have to be uploaded. Virtual disk chains are also not supported by all cloud environments, which means existing images cannot be updated. Instead, updates to existing images require the creation of a completely new disk. Further, it is not possible to author golden images in the cloud environments since a VM can only boot of it has an existing disk from which to boot. In order to boot multiple VMs from the same disk, the boot disk is cloned, i.e., a full copy of the boot disk is created. This is both expensive (as a customer is charged for N full copies of the boot disk) and time consuming (as cloning a disk takes a relatively long amount of time).

SUMMARY

The present disclosure concerns implementing systems and methods for operating a cloud based computing system. The methods comprise: storing blocks of the VHD data in pages of the cloud storage; receiving, by a cloud server, a request for accessing Virtual Hard Disk ("VHD") data associated with a first location in the VHD of a Virtual Machine ("VM") hosted by a remote computing device; extracting, by the cloud server, at least a first address specifying the first location from the request; translating, by the cloud server, the first address into a second address specifying a second location in a cloud storage where the VHD data is stored; using at least a portion of the second address to obtain cloud storage access information required to obtain access to the VHD data stored in the cloud storage; communicating from the cloud server the second address and/or the cloud storage access information to the remote computing device for facilitating access to the VHD data stored in the cloud storage; and/or providing the VHD data to the remote computing device in response to the cloud's reception of the second address and the cloud storage access information sent from the remote computing device.

In some scenarios, the first address comprises a Logical Block Address ("LBA"). The second address comprises an addressable cloud storage pool identifier and an addressable cloud storage pool offset value. The translating comprises: translating the first address into a row identifier for an entry in a table of a database (e.g., a relational database); and using the row identifier to access the entry of the table which stores a translation from a unique value (e.g., a hash value) identifying the VHD data to the second address.

In those or other scenarios, the methods further comprising: receiving, by the cloud server, a write request to write data to the VHD; computing, by the cloud server, a first hash value for the data in response to the write request; and searching a hash table for a row with a second hash value matching the first hash value. If a row is found with a second hash value matching the first hash value, then the method involves: updating a hash table row identifier for a row in a page table with a matching VHD version identifier and VHD logical block address to an existing entry; and returning. If a row is not found with a second hash value matching the first hash value, then the method involves: allocating a new data block in one of a plurality of storage objects; writing the data to the cloud storage; creating a row in the hash table with the hash value, an Addressable Cloud Storage Pool ("ACSP") identifier and an ACSP offset; and updating a row in a page table with a matching VHD version ID and a matching VHD Logical Block Address ("LBA") with a new HTR identifier value.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution provides a means to provision a large number of VMs sharing the same boot disk in cloud environments where thin clones are not supported. In this regard, the present solution uses a combination of cloud storage and a cloud based relational database. The term "cloud storage", as used herein, refers to a cloud computing model in which data is stored on remote servers accessed from the internet or cloud. The cloud storage is maintained, operated and managed by a cloud storage service provider on storage servers that are built on visualization techniques. The cloud storage is used to hold the data for all virtual disk versions. The cloud based relational database can be implemented using a Structured Query Language ("SQL"). SQL is a standard computer language for relational database management and data manipulation. SQL is used to query, insert, update and modify data. The cloud based relational database is used to hold metadata describing each virtual disk version.

The present solution overcomes various drawbacks of conventional solutions. In conventional systems, multiple cloud environments do not support thin clones of disks meaning that full disk clones are required which is much more expensive and time consuming when creating large number of identical VMs for VDI usage. The present solution uses the combination of cloud storage and a cloud database to implement thin clones and storage deduplication along with the storage aware driver in an Operating System ("OS") (e.g., Windows or Linux OS) environment. The present solution further allows virtual disks to span cloud storage locations. For example, in some cloud computing services (e.g., Microsoft Azure), a maximum size of a page Binary Large Object ("BLOB") is 1 TB. With the present solution, many virtual disks can be stored such that they are spread across multiple page BLOBs. The term "BLOB", as used herein, refers to a collection of binary data stored as a single entity in a database management system. The data can include, but is not limited to, images, audio, videos, and other media content.

The present solution can be used in various applications. For example, the present solution can be used to improve provisioning schemes (e.g., the Citrix Machine Creation Service ("MCS") and Citrix Provisioning Service ("PVS") provisioning schemes) in the cloud. For MCS, the present solution solves the storage provisioning issues. In PVS, the present solution solves the network streaming issues (since disks are no longer streamed) whilst allowing the management of virtual disks done by PVS to remain. This could be implemented so as to be largely transparent to the user of PVS.

Figure 1:
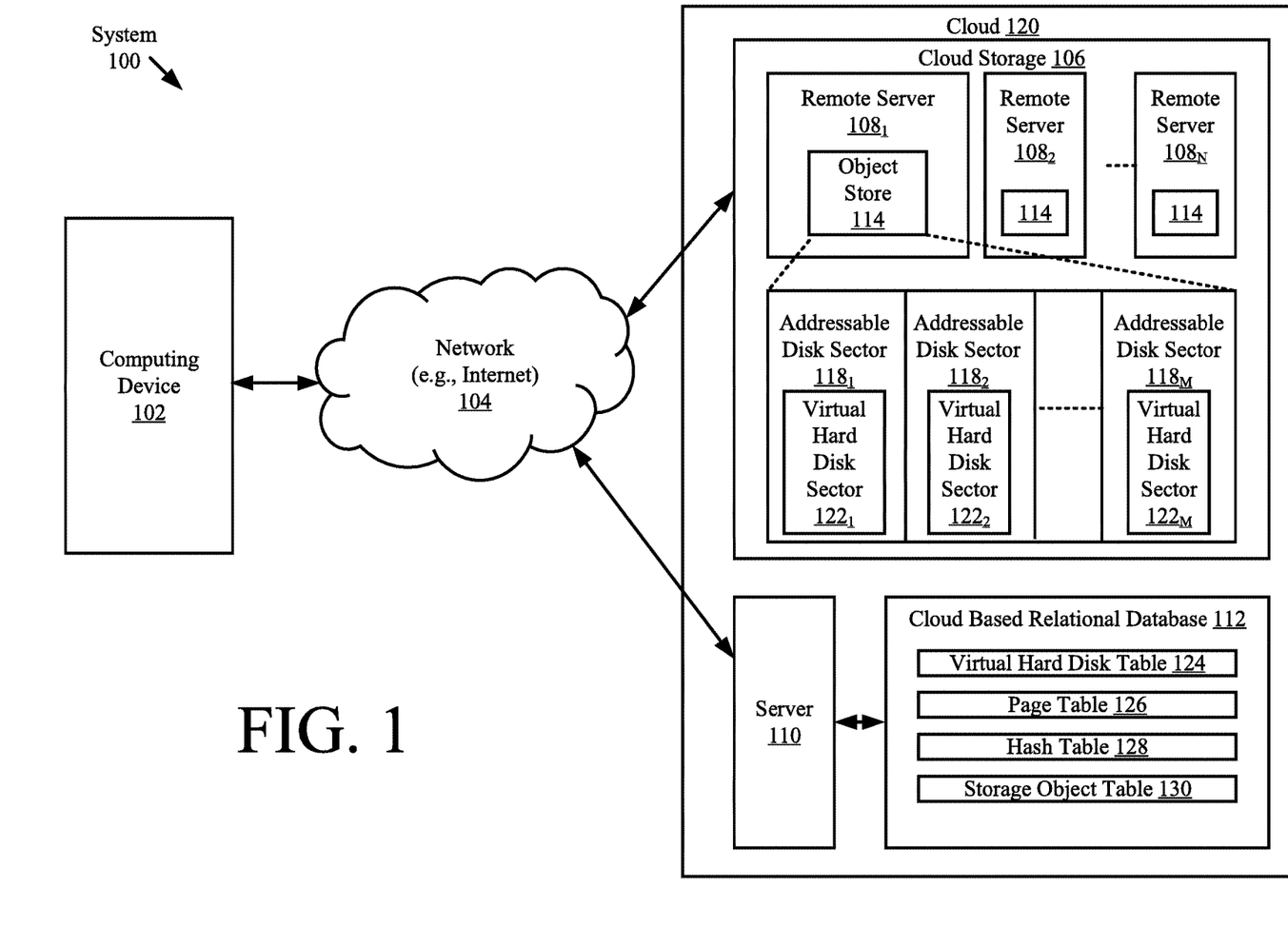
FIG. 1 is an illustration of an illustrative system.

Referring now to FIG. 1, there is provided an illustration of an illustrative system 100. System 100 is generally configured to provide thin provisioning VDI VMs without thin clone support. In this regard, system 100 comprises a computing device 102 communicatively coupled to a cloud 120 via a network 104 (e.g., the Internet). The client device 102 hosts a virtualization environment and is configured to read and write data to a cloud storage 106. The cloud storage 106 comprises a plurality of remote servers $108_1$, $108_2, \ldots, 108_N$. Each remote server $108_1, 108_2, \ldots, 108_N$ provides an object store 114. The object store 114 includes a plurality of addressable disk sectors $118_1, 118_2, \ldots, 118_M$, and is optimized for random access. The disk sectors $118_1$, $118_2, \ldots, 118_M$ are used to store de-duplicated data $122_1$, $122_2, \ldots, 122_M$ for a plurality of VHDs. De-duplicated data comprises identical blocks of data which are stored only once in the cloud storage, whereby duplicate copies of repeating data is eliminated. The process of generating de-duplicated data is referred to herein as de-duplication or data de-duplication. In some scenarios, VHD blocks of data are stored in pages in the cloud storage.

Disk sectors from one or more of the object stores 114 can be used to define a storage pool. Thus, the term "storage pool", as used herein, refers to a capacity aggregated from one or more storage resources. One or more storage pools can be defined in the cloud storage 106. The storage pools can have the same or different sizes. The storage pools allow many VHDs to span cloud storage locations.

The cloud 120 also comprises a server 110 and a cloud based relational database 112 providing a storage virtualization layer on top of the cloud storage. These components 110, 112 provide a way to ensure that only authorized computing device's obtain access to the cloud storage 106, as well as facilitates the provisioning of a large number of VMs sharing the same base disk in a cloud environment that does not support thin clones. In this regard, a plurality of tables 124-130 are stored in the cloud based relational database 112 which is accessible to the server 110. The tables include a VHD table 124, a page table 126, a hash table 128, and a storage object table 130. The tables are used to keep track of where de-duplicated data for VHDs are stored in the cloud storage 106. The particulars of these tables will be discussed in more detail below.

In some scenarios, the cloud based relational database 112 comprises a Structured Query Language ("SQL") database. SQL databases are well known in the art, and therefore will not be described herein. The present solution is not limit in this regard. Other types of relational databases can be used herein.

Figure 2:
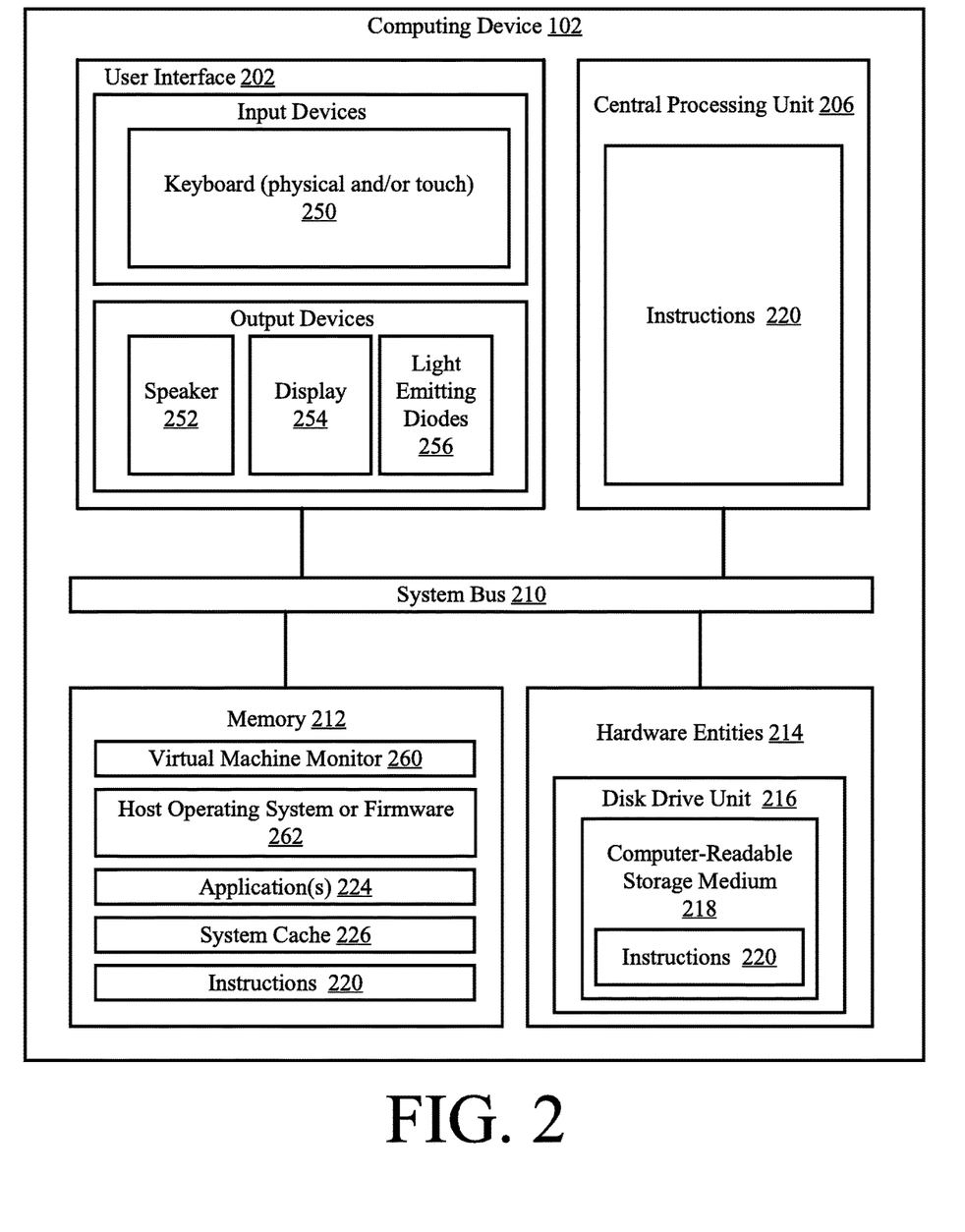
FIGS. 2-3 provide illustrations of an illustrative architecture for the computing device shown in FIG. 1.

Referring now to FIG. 2, there is provided an illustrative architecture for computing device 102 of FIG. 1. Servers $108_1, 108_2, \ldots, 108_N$, and/or 110 of FIG. 1 are the same as or similar to computing device 102. As such, the discussion of computing device 102 is sufficient for understanding servers $108_1, 108_2, \ldots, 108_N$, and/or 110 of FIG. 1.

Computing device 102 may include more or less components than those shown in FIG. 2. However, the components shown are sufficient to disclose an illustrative embodiment implementing the present solution. The hardware architecture of FIG. 2 represents one embodiment of a representative computing device configured to provide thin provisioning VDI VMs without thin clone support. As such, the computing device 102 of FIG. 2 implements at least a portion of each method described herein.

Some or all components of the computing device 102 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a CPU 206, a system bus 210, a memory 212 connected to and accessible by other portions of computing device 102 through system bus 210, and hardware entities 214 connected to system bus 210. The user interface can include input devices and output devices, which facilitate user-software interactions for controlling operations of the computing device 102. The input devices include, but are not limited, a physical and/or touch keyboard 250. The output devices include, but are not limited to, a speaker 252, a display 254, and/or light emitting diodes 256.

At least some of the hardware entities 214 perform actions involving access to and use of memory 212, which can be a Random Access Memory ("RAM"), a disk driver and/or a Compact Disc Read Only Memory ("CD-ROM"). Memory 212 comprises a system cache 226. Memory 212 can have stored therein a Virtual Machine Monitor ("VMM") 260, a host Operating System ("OS") or firmware 262, application(s) 224, and/or instructions 220, as shown in FIG. 1.

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 120 for execution by the computing device 102 and that cause the computing device 200 to perform any one or more of the methodologies of the present disclosure.

In some scenarios, the hardware entities 214 include an electronic circuit (e.g., a processor) programmed for facilitating thin provisioning VDI VMs without thin clone support. In this regard, it should be understood that the electronic circuit can access and run software applications 224 installed on the computing device 102. One software application 224 is generally operative to facilitate thin provisioning VDI VMs without thin clone support. The functions of the software application 224 will become apparent as the discussion progresses.

Figure 3:
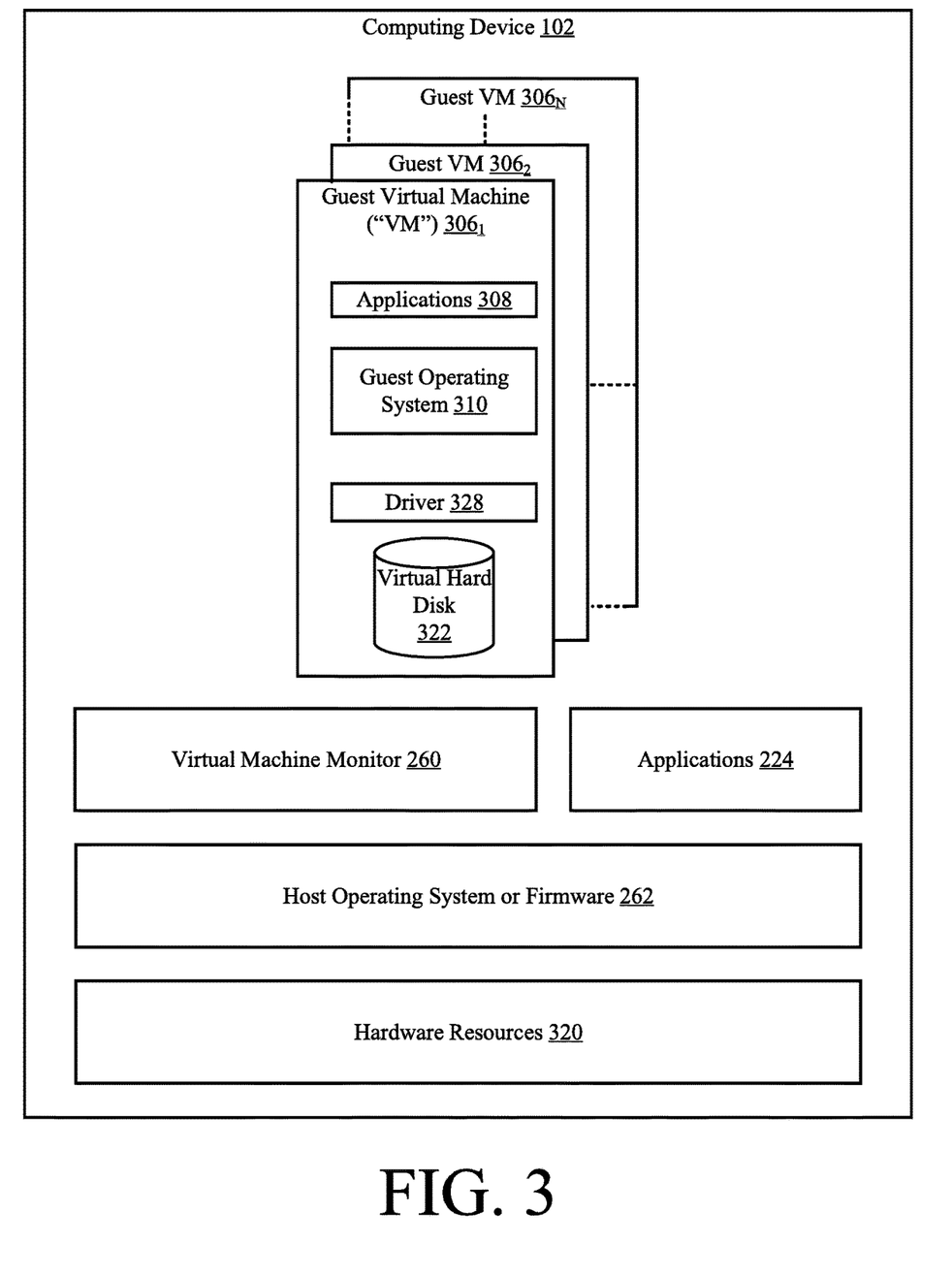

Referring now to FIG. 3, there is provided an illustration of the basic concepts of virtualization environment hosted by the computing device 102. As shown in FIG. 3, the computing device 102 runs a general purpose host OS or firmware 262 that manages access of one or more applications 224 to hardware resources 320. The hardware resources 320 include, but are not limited to, the hardware device 202-256 shown in FIG. 2.

A VMM 260 (or hypervisor) runs on the host computing device 102 and emulates the hardware of a physical system. The host computing device runs the VMM 260 in order to enable the concurrent execution of additional OS instances. From the perspective of the host OS or firmware 262, the VMM 260 is an application. The VMM 260 is generally a piece of software that creates VMs $306_1, 306_2, \ldots, 306_N$ and manages the operation of the virtualized environment on top of the physical host computing device 102. In this regard, the VMM 260 coordinates instructions to the CPU 206. The VMM 260 validates all the guest-issued CPU instructions and manages any executed code that required additional privileges. The additional OS instances run on the guest VMs $306_1, 306_2, \ldots, 306_N$.

Each guest VM is a software computer that runs a guest OS 310 (e.g., Windows 10) in an environment that is isolated from the host OS 262, from the other guest VMs. The guest OS 310 hosts its own set of applications 308 and is installed on a VHD 322. The VHD 322 is implemented as a file that is stored on a file system accessible to the host computing device 102. From the perspective of the guest OS 310, the VHD 322 cannot be distinguished from a physical storage medium (e.g., memory 212 of FIG. 2). The VHD 322 stores a system image containing the complete content and structure of a physical hard disk. Multiple VHDs containing disk images can be attached to the VM. The host computing device 102 controls access of the VM to the available hardware resources, such as a physical memory 212 of FIG. 2.

As noted above, the present solution provides a means to provision a large number of VMs sharing the same boot disk (for use by many individuals to connect their computers to) in cloud environments that does not support thin clones. In this regard, each guest VM $306_1, 306_2, \ldots, 306_N$ comprise a driver 328. Driver 328 is configured to receive, from the guest OS 310, requests for accessing data stored in the VHD 322. In response to the requests, the driver 328 performs operations to communicate with the cloud 120 for purposes of obtaining access to data for the VHD which is stored in the cloud storage 106. The process for obtaining access to the cloud storage will be discussed in more detail below in relation to FIG. 4.

Figure 4:
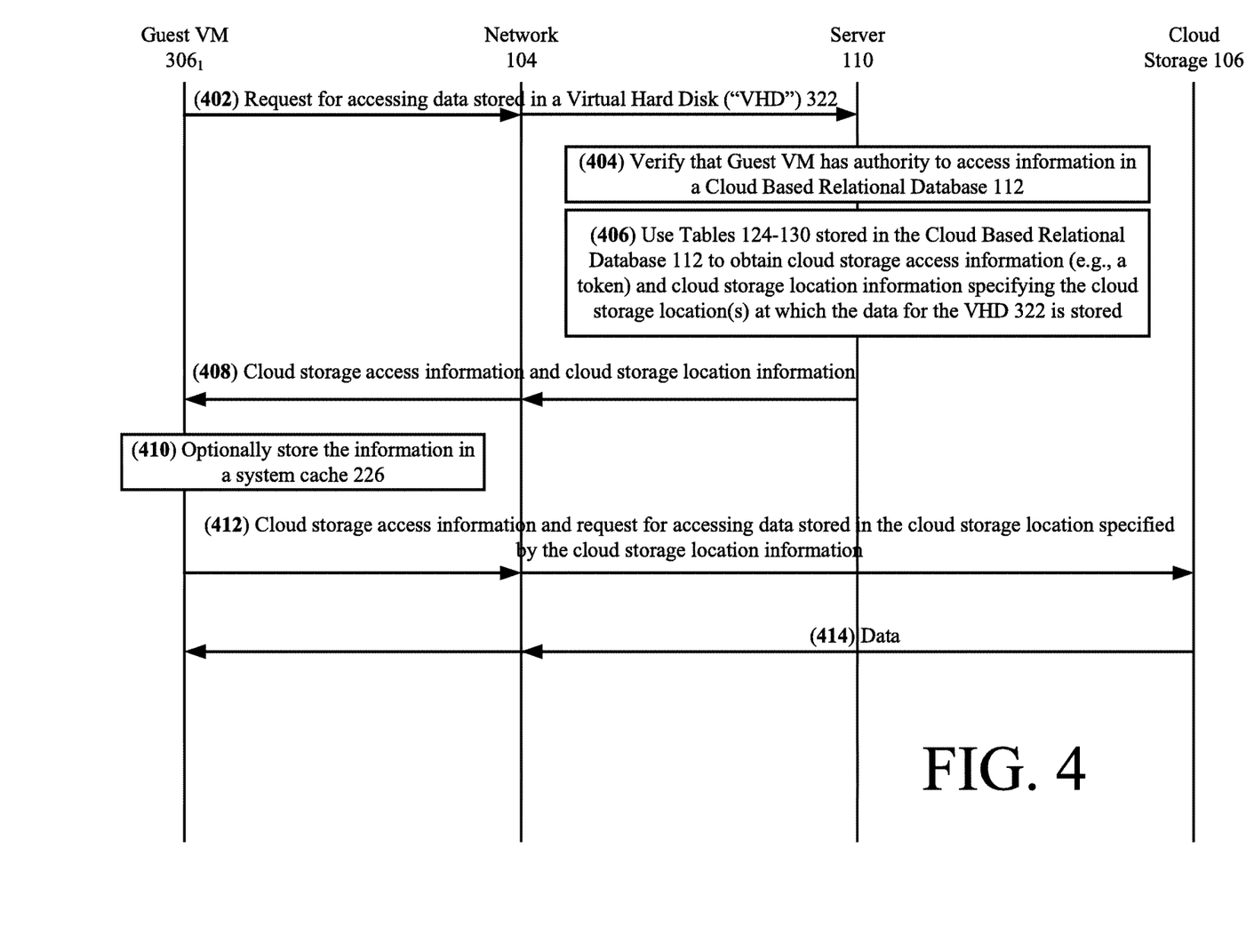
FIG. 4 is a message flow for the system of FIG. 1.

Referring now to FIG. 4, there is provided a message flow diagram for accessing the cloud storage 106. During operation, the driver 328 of the guest VM $306_1$ communicates a request for accessing data stored in the VHD 322 to the server 110 via the network 104, as shown by 402. At the server 110, operations are performed in 404 to verify that the guest VM $306_1$ has authority to access information in the cloud based relational database 112. If so, then the server 110 accesses the tables 124-130 stored in the cloud based relational database 112, and uses the contents of the tables to obtain cloud storage access information (e.g., a token) and cloud storage location information specifying the cloud storage location(s) at which de-duplicated data for the VHD 322 is stored, as shown by 406. Next in 408, the sever 110 communicates the cloud storage access information and the cloud storage location information to the guest VM 306$_1$ via the network 104. This information may be stored in a system cache 226 of the computing device 102, as shown by 410. Subsequently in 412, the driver 328 of the guest VM 306$_1$ communicates the cloud storage access information and a request to the cloud storage 106 via the network 104. The request is for accessing data stored in the cloud storage location(s) specified by the cloud storage location information. In response to the request, the data is retrieved from the cloud storage 106, and communicated to the driver 328 of the guest VM 306$_1$, as shown by 414.

The operations of the server 110 will now be described in detail with reference to FIGS. 5-8. As noted above, the server 110 access tables 124-130 stored in the cloud based relational database 112, and uses the tables 124-130 to obtain cloud storage access information (e.g., a token) and cloud storage location information specifying the cloud storage location(s) at which the de-duplicated data for a VHD is stored. The tables 124-130 include a VHD table 124, a page table 126, a hash table 128, and a storage object table 130.

Figure 5:
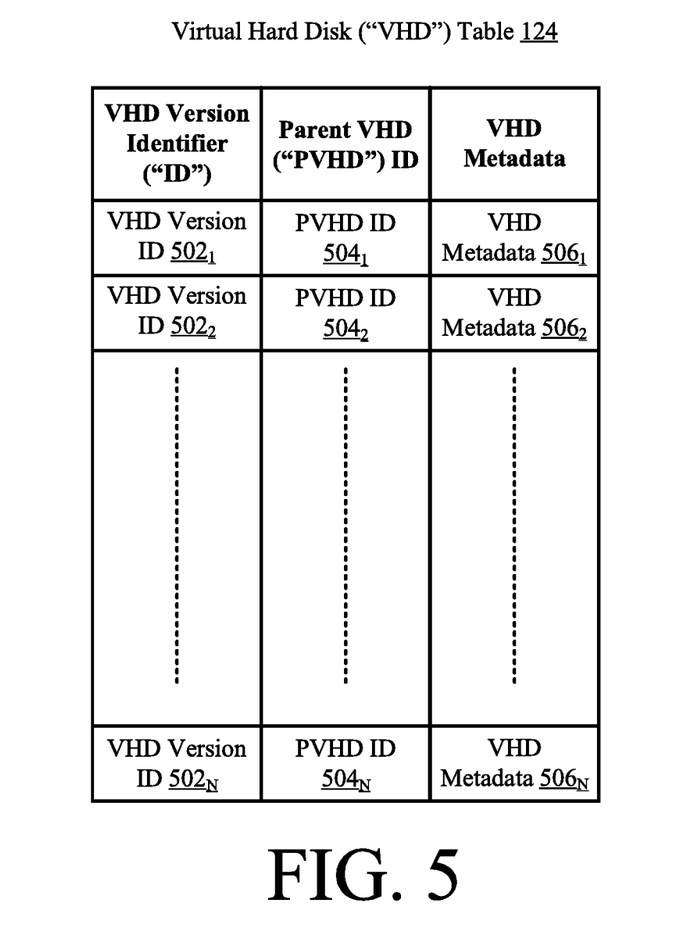
FIG. 5 is an illustration of an illustrative Virtual Hard Disk ("VHD") table.

As shown in FIG. 5, the VHD table 124 comprises a plurality of rows and columns. Each row includes the following three values associated with a given VHD (e.g., VHD 322 of FIG. 3): a VHD version Identifier ("ID") 502$_1$, 502$_2$, . . . , or 502$_N$ identifying a version of the given VHD; a Parent VHD ("PVHD") ID 504$_1$, 504$_2$, . . . , or 504$_N$ identifying the parent VHD for the VHD version; and VHD metadata 506$_1$, 506$_2$, . . . , or 506$_N$ for the given VHD. The term "version", as used here, refers to a temporal state of a VHD. In this regard, it should be understood that a VHD's state changes over time. As such, sets of de-duplicated data defining the contents of the VHD at certain times is stored in the cloud storage. Each set of de-duplicated data for the VHD constitutes a VHD version.

Figure 6:
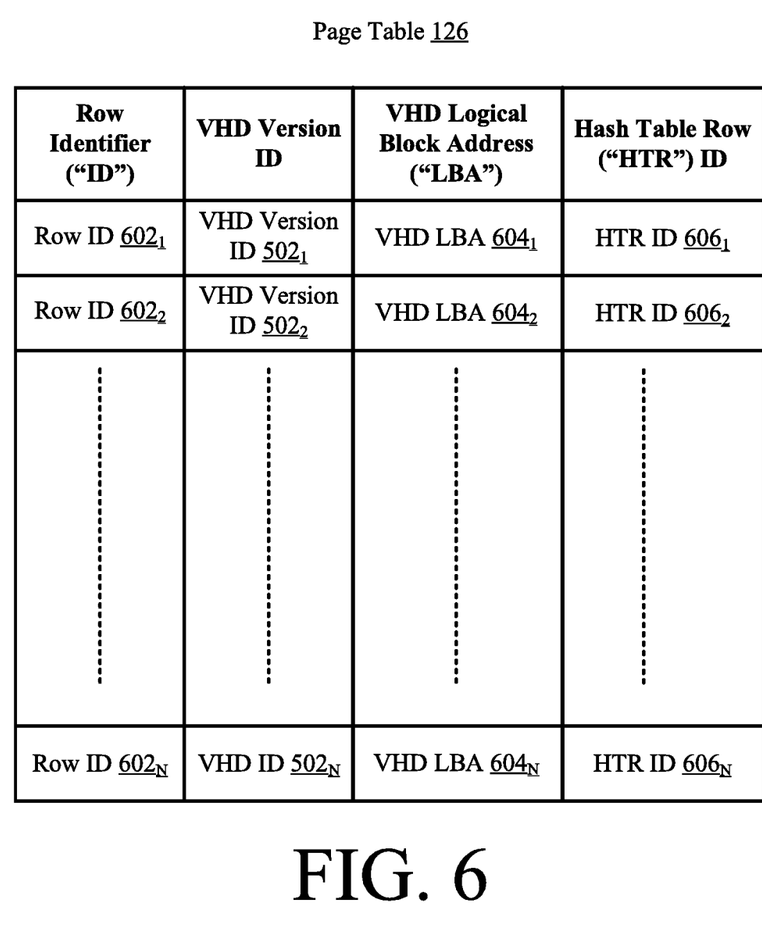
FIG. 6 is an illustration of an illustrative page table.

As shown in FIG. 6, the page table 126 comprises a plurality of rows and columns. There is a row in the page table for each logical block of a VHD version. This row provides a means to translate the LBA of the logical block to a row in the hash table 128, which contains the location in cloud storage where the data is stored. Each row includes the following four values associated with a given VHD version identified in the VHD table 124: a row ID 602$_1$, 602$_2$, . . . , or 602$_N$ identifying a particular row of the page table 126; a VHD version ID 502$_1$, 502$_2$, . . . , or 502$_N$ identifying a version of a VHD; a VHD Logical Block Address ("LBA") 604$_1$, 604$_2$, . . . , or 604$_N$ identifying at least one sector of the VHD where at least one block of data for the VHD version is stored; and a Hash Table Row ("HTR") ID 606$_1$, 606$_2$, . . . , or 606$_N$ identifying a row in a hash table where further information associated with the at least one block of data for the VHD version is stored.

Figure 7:
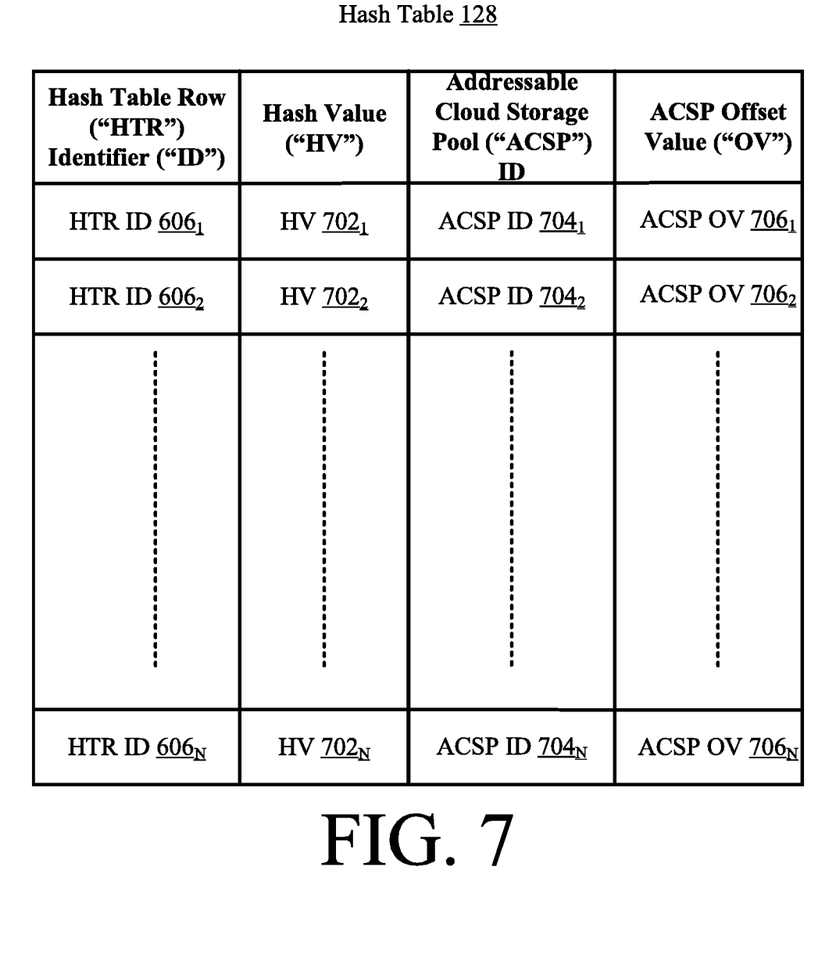
FIG. 7 is an illustration of an illustrative hash table.

The HTR ID 606$_1$, 606$_2$, . . . , or 606$_N$ indicates the relationship between the page table 126 and the hash table 128. These two tables facilitate the translation of an LBA for a VHD version to a cloud storage pool address, as will become more evident as the discussion progresses.

As shown in FIG. 7, the hash table 128 comprises a plurality of rows and columns. Each row includes the following four values associated with a given hash table row ID identified in the page table 126: an HTR ID 606$_1$, 606$_2$, . . . , or 606$_N$; a Hash Value ("HV") 702$_1$, 702$_2$, . . . , or 702$_N$; an Addressable Cloud Storage Pool ("ACSP") ID 704$_1$, 704$_2$, . . . , or 704$_N$ identifying a storage pool of a cloud storage; and an ACSP Offset Value ("OV") 706$_1$, 706$_2$, . . . , or 706$_N$ indicating a block location in the storage pool. The ACSP ID and ACSP OV collectively provide the cloud storage pool address to cloud storage locations where the de-duplicated data having the HV 702$_1$ is stored.

In some scenarios, the HV is computed using a hash algorithm based on the data for the VHD. Hash algorithms are well known in the art, and therefore will not be described herein. Any known or to be known hash algorithm can be used herein without limitation. For example, the SHA-256 cryptographic hash algorithm is used to generate the hash values from data content of VHDs, where the hash values represent the original data content. The present solution is not limited to hash algorithms. Other algorithms can be used here to compute a unique value from the disk block contents. These other algorithms should meet most of the same requirements as a cryptographic hash function—this it: it is deterministic so the same message always results in the same hash; it is quick to compute the hash value for any given message; and it is infeasible to find two different messages with the same hash value.

Figure 8:
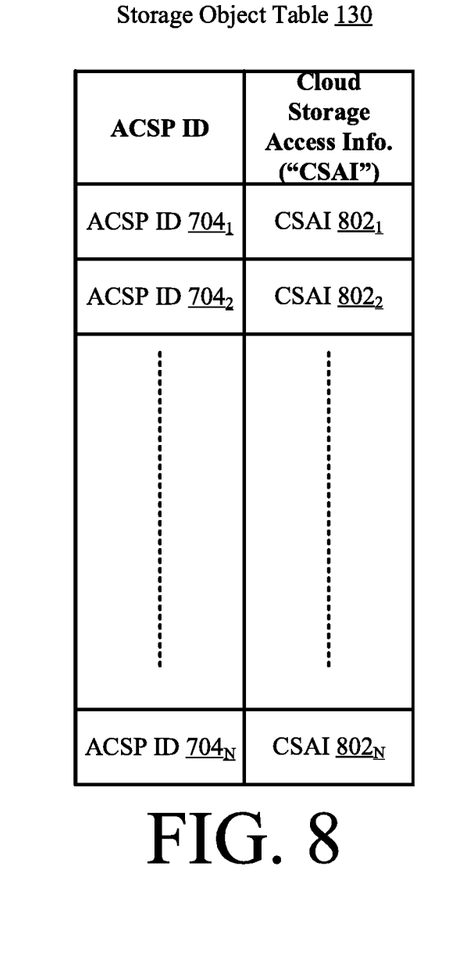
FIG. 8 is an illustration of an illustrative storage object table.

As shown in FIG. 8, the storage object table 130 comprises a plurality of rows and columns. Each row comprises at least two values: an ACSP ID 704$_1$, 704$_2$, . . . , or 704$_N$; and Cloud Storage Access Information ("CSAI") 802$_1$, 802$_2$, . . . , or 802$_N$. The CSAI includes, but is not limited to, a Universal Resource Link ("URL"), a token, and/or a key.

Notably, these tables 124-130 provide the storage virtualization layer on top of the cloud storage. The storage virtualization layer is implemented as follows. Virtual disk blocks are stored in pages of the cloud storage. A hash table is used to keep track of which VHD blocks have been stored in the cloud storage. For each block, a hash of the data is calculated. The hash table stored the translation from the hash to an offset in the cloud storage. Each VHD is recorded in a VHD table 124 that includes a reference to the parent VHD version. For each, logical block in the VHD, there is a row in the page table 126 that translated the LBA to the row ID in the hash table 128 which contains the location in the cloud storage where the data is stored.

With the above table structure, adding a thin clone to the existing VHD is simply a matter of adding a row to the VHD table 124 that points to the parent entry. No storage is consumed by the thin clone until a VM issues write requests thereto.

In addition, the use of a hash to locate entries in the page storage permits the de-duplication of the data storage so only unique pages are stored. This reduces the amount of storage used by a relatively large amount when multiple VHDs running similar OS versions are uploaded. For example, if there are two golden images based on Windows10, then the reduction can be as high as 75% taking both duplicate contents and zero pages into account.

Figure 9:
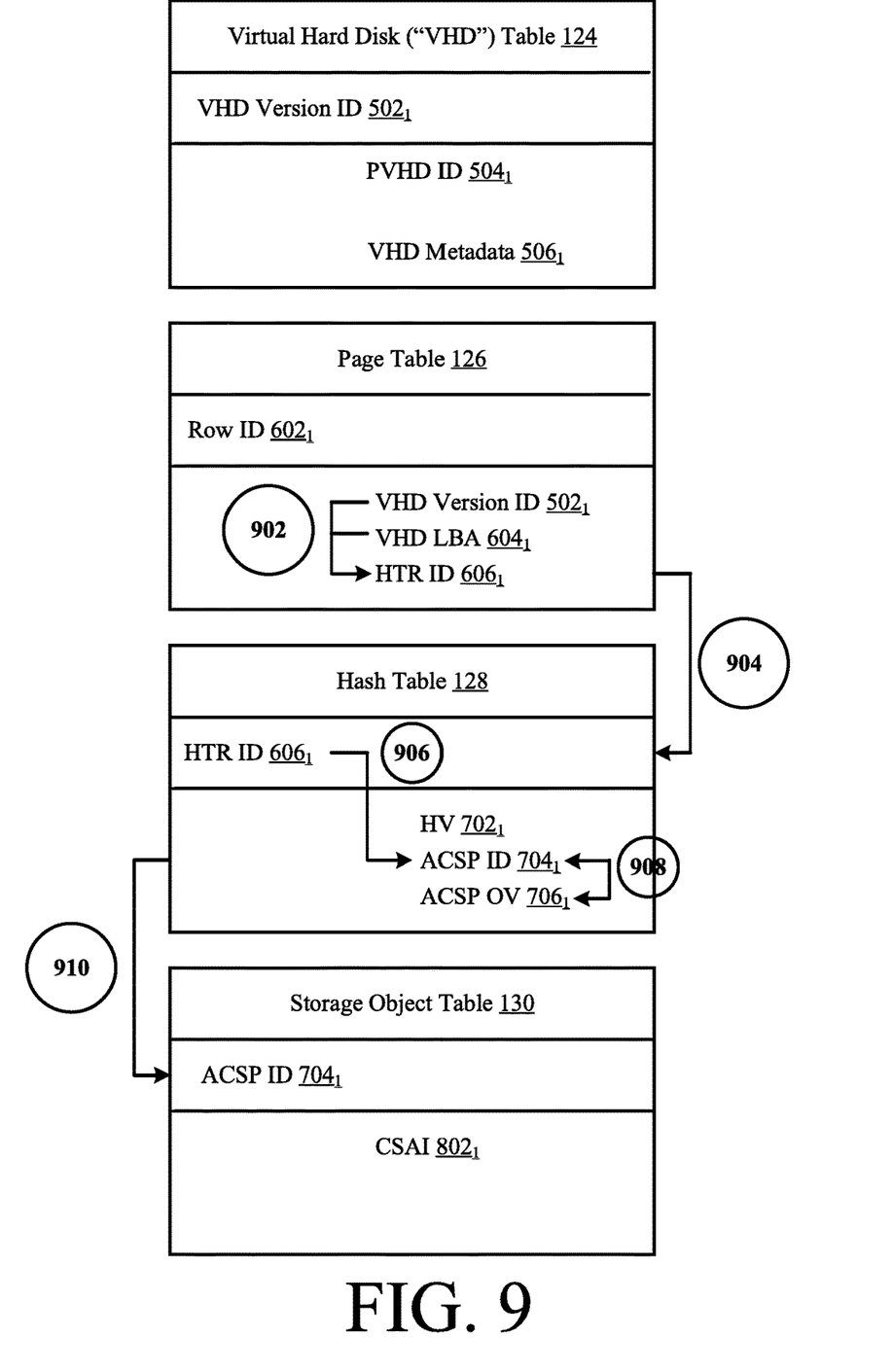
FIG. 9 is an illustration that is useful for understanding the relationships between the tables of FIG. 5-8.

Referring now to FIG. 9, there is provided an illustration that is useful for understanding (a) the relationships between the tables 124-130, and (b) how the server 110 uses the tables 124-130 for obtaining cloud storage access information (e.g., a token) 802$_1$, 802$_2$, . . . , or 802$_N$ and cloud storage location information 704$_1$, 704$_2$, . . . , 704$_N$, 706$_1$, 706$_2$, . . . , 706$_N$ specifying the cloud storage location(s) at which the de-duplicated data for a VHD is stored.

At first, a VHD 322 is empty. Thus, there are no rows in the page table 126 associated with the VHD 322. If a read from the VHD 322 is attempted, then an empty data set is returned to the computing device 102.

Later on, data is written to blocks $b_0$-$b_X$ in the VHD 322. As a result of these write operations, a row is added to the VHD table 124 indicating that a version of the VHD 322 has been stored in the cloud storage 120. The VHD 322 has a unique identifier PVHD ID $504_1$ associated therewith. This version has a unique identifier VHD version ID $502_1$ associated therewith. Metadata $506_1$ for the VHD version is also stored in this row of the VHD table 124.

The page table 126 also comprises a row for this version of the VHD which has a row ID $602_1$. This row includes the VHD version ID $502_1$ and the LBA $604_1$ for the data written to blocks $b_0$-$b_X$ of the VHD 322. This row also stores the translation of the LBA for blocks $b_0$-$b_X$ to a hash table entry identified by HTR ID $606_1$.

A hash value is computed for the data written to blocks $b_0$-$b_X$. The hash value is stored in the hash table 128 so as to be associated with the hash table entry HTR ID $606_1$. The hash table entry further stores the translation from the hash value $702_1$ to a cloud storage pool address $704_1$, $706_1$ specifying the location in the cloud storage 120 where the data blocks have been stored. An entry is added to the storage object table 130 storing the information needed to access the cloud storage pool. This information in indexed in the storage object table 130 by the cloud storage pool address $704_1$.

At early boot time, a request is sent from the computing device 102 to the server 110. In response to the request, the server 110 performs operations to determine which VHD and version thereof a guest VM should be boot from using the VHD table 124. Once the guest OS 310 of the guest VM $306_1$ is loaded and running, a driver 328 of the guest VM $306_1$ communicates with the server 110 to retrieve configuration information $506_1$. Thereafter, the VHD version ID $502_1$ is used to lookup I/O requests for the VHD version by LBA, as shown by 902-908.

For each I/O request issued by applications 308 of the guest VM $306_1$ to the VHD 322, the driver 328 communicates a request to the server 110. The request includes a PVHD ID $504_1$, VHD version ID $502_1$ and/or an VHD LBA $604_1$ for a given block of data. The VHD version ID $502_1$ and the LBA $604_1$ are used to look up (a) information specifying the addressable disk sectors of the cloud storage in which the logical blocks having a given LBA are stored and (b) the cloud storage access information that is needed for accessing the addressable disk sectors of the cloud storage, as shown by 902-910. In this regard, the server 110 performs operations to translate the LBA $604_1$ to an entry $606_1$ in the hash table 128 which contains the location in the cloud storage where the corresponding data is stored. The hash table entry $606_1$ stores the translation of a respective hash value $702_1$ to a cloud storage pool address $704_1$, $706_1$. The cloud storage pool address $704_1$ is then used to look up the CSAI $802_1$.

An illustrative database lookup is provided below.
SELECT (h.acsp_id, h.acsp_ov) from page_table AS p INNER JOIN hash_table AS h ON p.hash_table_id=h.id WHERE p.version=% d AND p.lba=% d;', (self.version, lba)
The present solution is not limited to the particulars of this example.

Figure 10:
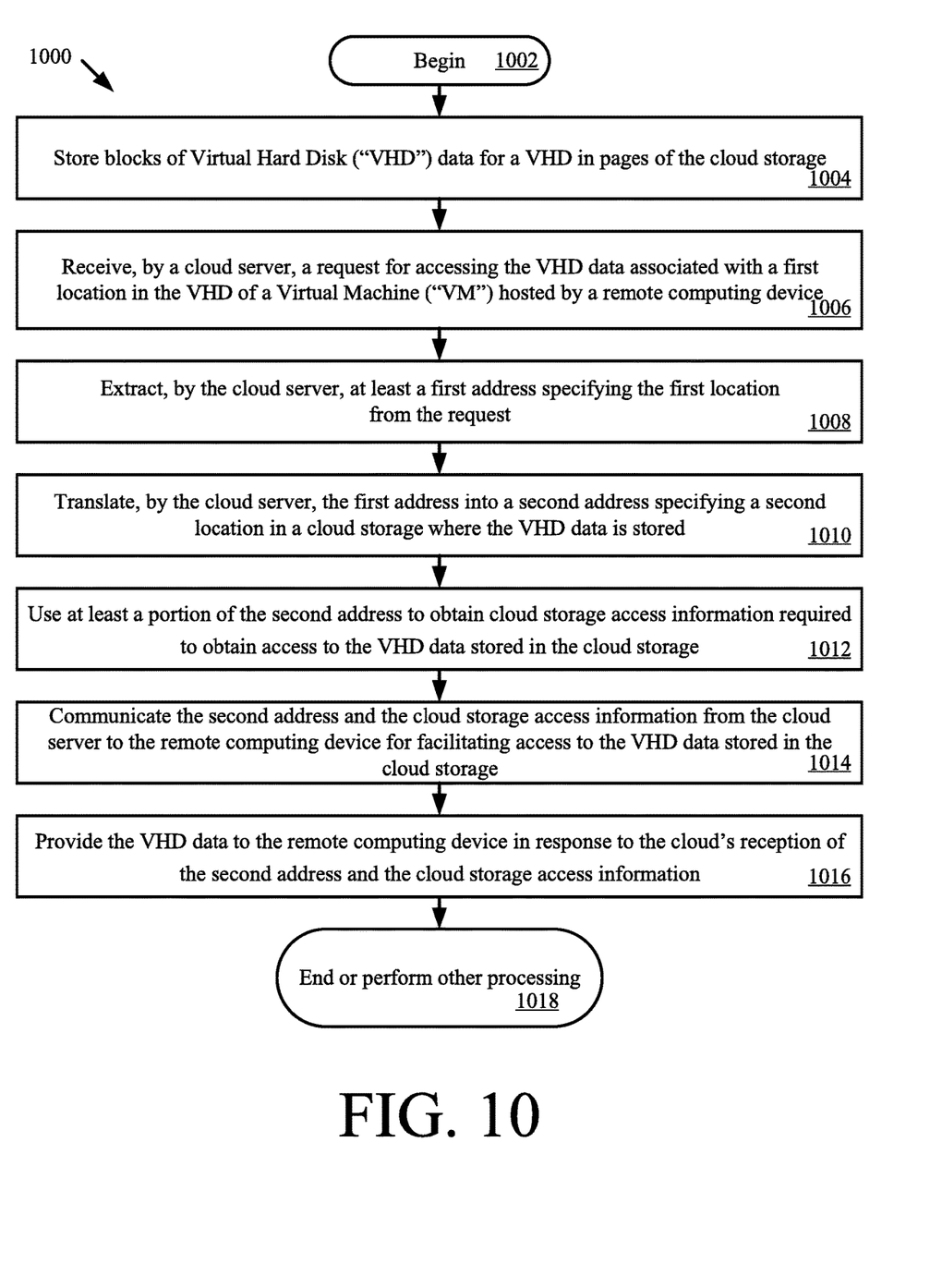
FIG. 10 is a flow diagram of an illustrative method for operating a cloud based computing system.

Referring now to FIG. 10, there is provided a flow diagram of an illustrative method 1000 for operating a cloud based computing system (e.g., system 100 of FIG. 1). The method 1000 begins with 1002 and continues with 1004 where blocks of VHD data is stored in pages of cloud storage (e.g., cloud storage 120 of FIG. 1). In next 1006, a cloud server (e.g., cloud server 110 of FIG. 1) receives a request for accessing the VHD data associated with a first location in a VHD (e.g., VHD 322 of FIG. 3) of a VM (e.g., VM $306_1$ of FIG. 3) hosted by a remote computing device (e.g., computing device 102 of FIGS. 1 and 4). At the cloud server, the request is processed in 1008 to extract at least a first address (e.g., VHD LBA $604_1$ of FIG. 6) therefrom. The first address specifies the first location in the VHD of the VM. In 1010, the cloud server performs operations to translate, the first address into a second address (e.g., ACSP ID $704_1$ and ACSP OV $706_1$ of FIG. 7) specifying a second location in a cloud storage where the VHD data is stored. This translation is achieved by: translating the first address into a row identifier (e.g., HTR ID $606_1$ of FIG. 6) for an entry in a table (e.g., hash table 128 of FIG. of 7) of a database (e.g., cloud based relational database 112 of FIG. 1); and using the row identifier to access the entry of the table which stores a translation from a unique value (e.g., HV $702_1$ of FIG. 7) identifying the VHD data to the second address (e.g., ACSP ID $704_1$ and ACSP OV $706_1$ of FIG. 7). The second address (e.g., ACSP ID $704_1$ of FIG. 7) is used in 1012 to obtain cloud storage access information (e.g., CSAI $802_1$ of FIG. 8) required to obtain access to the VHD data stored in the cloud storage. The second address and the cloud storage information is then communicated from the cloud server to the remote computing device for facilitating access to the VHD data stored in the cloud storage, as shown by 1014. In 1016, the VHD data is provided to the remote computing device in response to the cloud's reception of the second address and the cloud storage access information sent from the remote computing device. Subsequently, 1018 is performed where method 1000 ends or other processing is performed.

Figure 11:
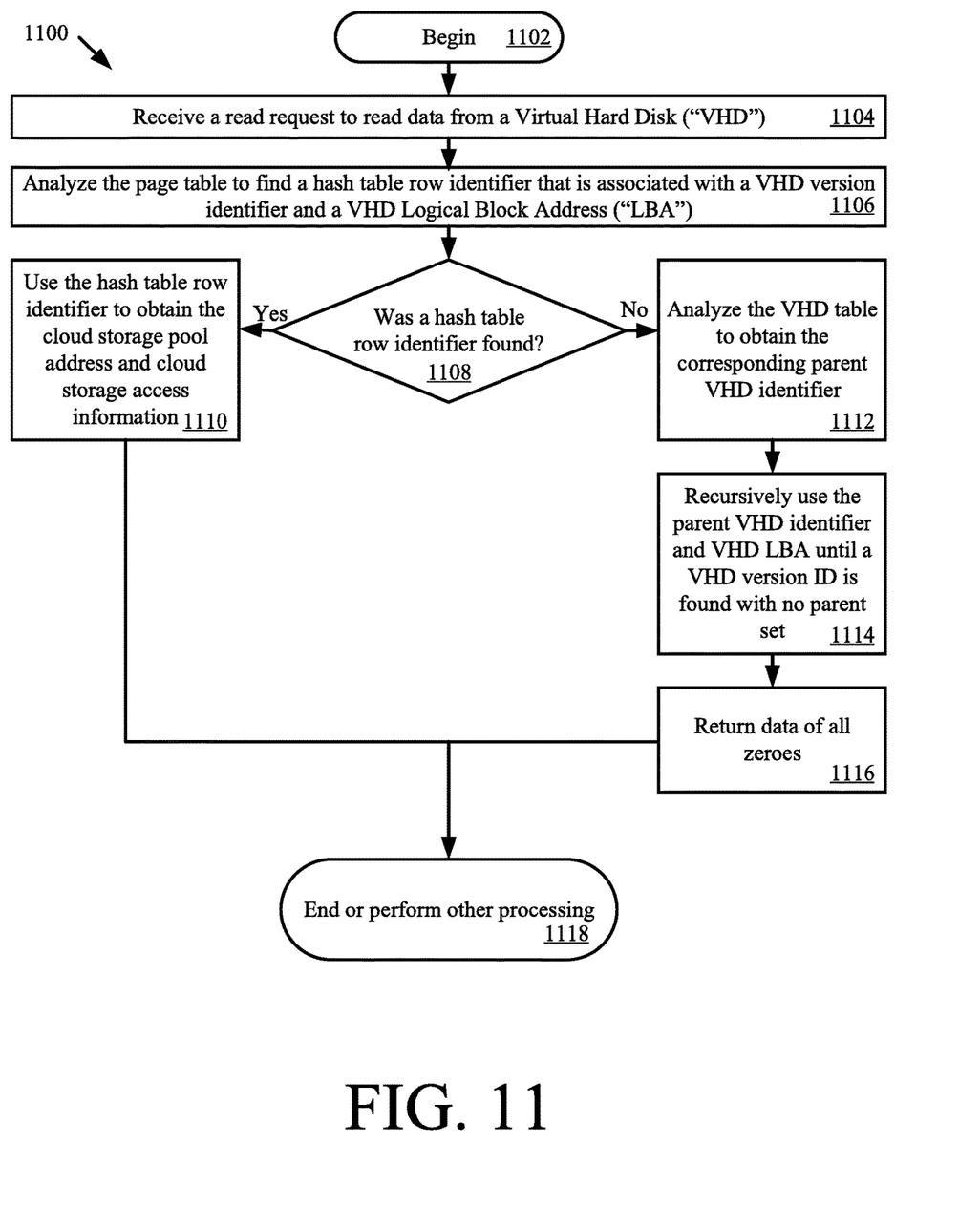
FIG. 11 is a flow diagram of an illustrative read process.

Referring now to FIG. 11, there is provided a flow diagram of an illustrative read process 1100. The read process 1100 begins with 1102 and continues with 1104 where a read request is received for reading data from a VHD. In response to the read request, the page table is analyzed in 1106 to find an HTR ID that is associated with a VHD version ID and a VHD LBA. If an HTR ID was found [1108:YES], then 1110 is performed where the HTR ID is used to obtain the cloud storage pool address and cloud storage pool access information. Thereafter, 1118 is performed where method 1100 ends or other processing is performed. In contrast, if the HTR ID was not found [1108:NO], then 1112 is performed where the VHD table is analyzed to obtain the corresponding PVHD ID. The PVHD ID and VHD LBA are then recursively used until a VHD version ID is found with no parent set, as shown by 1114. In this case, data of all zeroes is returned in 1116. Subsequently, method 1100 ends or other processing is performed.

Figure 12:
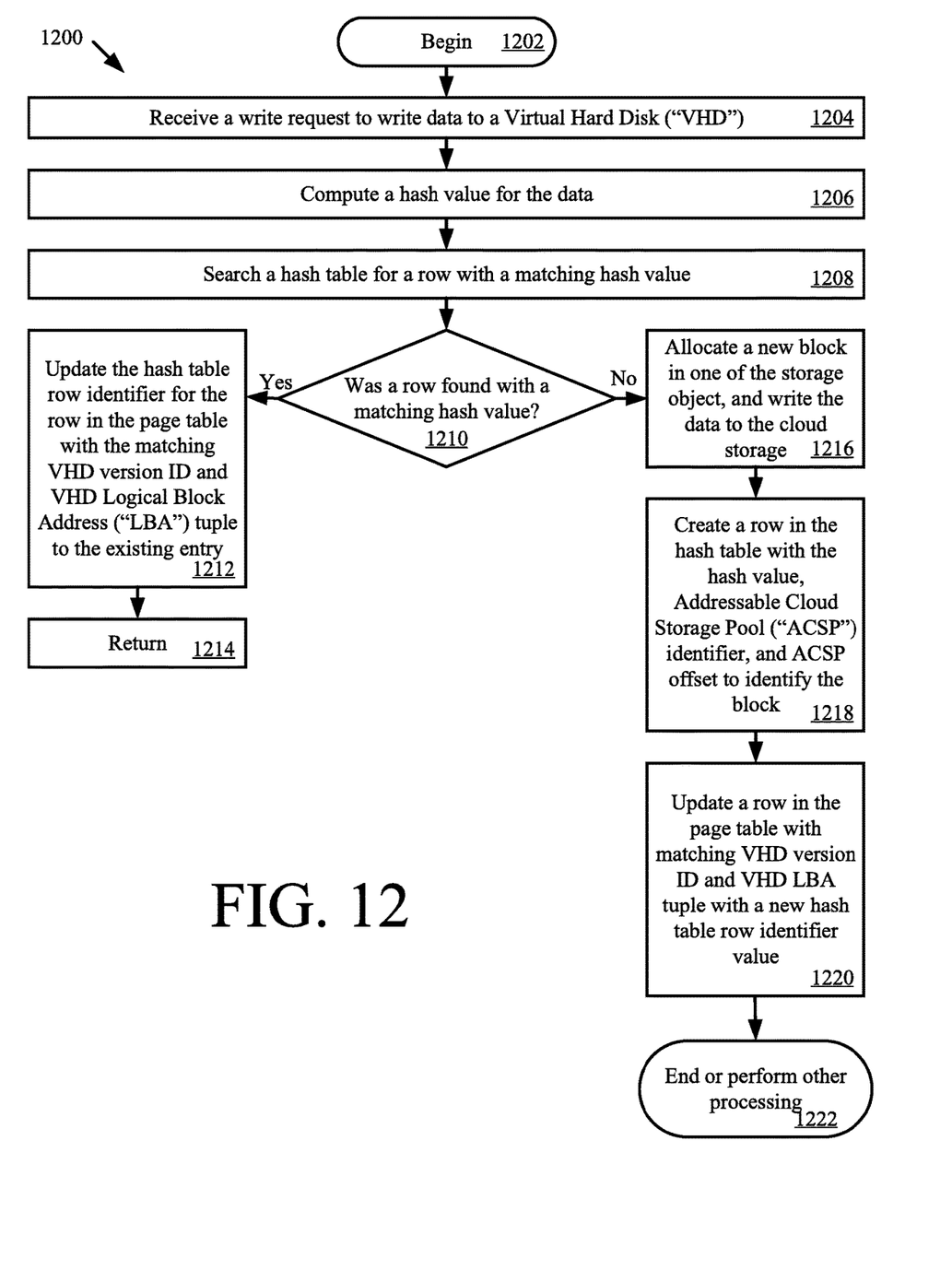
FIG. 12 is a flow diagram of an illustrative write process.

Referring now to FIG. 12, there is provided a flow diagram of an illustrative write process 1200. The write process 1200 begins with 1202 and continues with 1204 where a write request to write data to a VHD is received. In response to the write request, a hash value for the data is computed in 1206. Next in 1208, the hash table 128 is searched for a row with a matching hash value. If a row is found with a matching hash value [1210:YES], then the HTR identifier is updated for the row in the page table 126 with the matching VHD version ID and VHD LBA tuple to the existing entry. Subsequently, 1214 is performed where the write process 1100 returns (no data write is required because the data is already stored in the cloud storage). If a row is not found with a matching hash value [1210:NO], then 1216-1220 are performed. 1216-1220 involve: allocating a new data block in one of the storage objects; writing the data to the cloud storage; creating a row in the hash table 128 with the hash value, ACSP identifier and ACSP offset to identify the block; updating a row in the page table 126 with matching VHD version ID and VHD LBA tuple with a new HTR identifier value. Subsequently, 1222 is performed where the write process 1200 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a computing system, comprising:
   receiving, by a server, a request for accessing Virtual Hard Disk ("VHD") data associated with a first location in a VHD of a plurality of VHDs for a Virtual Machine ("VM") hosted by a remote computing device, the request comprising at least a VHD version identifier and a first address;
   in response to the request, performing operations by the server to verify that the VM has authority to access information in a relational database;
   in response to a verification that the VM has authority, extracting, by the server, at least the VHD version identifier and the first address from the request, the first address specifying the first location in the VHD, using, by the server, the VHD version identifier to facilitate a translation of the first address into a second address specifying a second location in a storage where the VHD data is stored in a page in the storage, the storage being remote from the server and the remote computing device, and
   communicating from the server the second address to the remote computing device for facilitating access to the VHD data stored in the storage, wherein the second location includes stored de-duplicated data in the page for the VHD.

2. The method according to claim 1, further comprising storing blocks of the VHD data in pages of the storage.

3. The method according to claim 2, wherein the second address comprises an addressable storage pool identifier and an addressable storage pool offset value.

4. The method according to claim 1, wherein the first address comprises a Logical Block Address ("LBA").

5. The method according to claim 1, wherein the translating comprises translating the first address into a row identifier for an entry in a table of a database.

6. The method according to claim 5, wherein the database comprises the relational database.

7. The method according to claim 5, wherein the translating comprises using the row identifier to access the entry of the table which stores a translation from a unique value identifying the VHD data to the second address.

8. The method according to claim 7, wherein the unique value comprises a hash value.

9. The method according to claim 1, further comprising using at least a portion of the second address to obtain storage access information required to obtain access to the VHD data stored in the storage.

10. The method according to claim 9, further comprising providing the VHD data to the remote computing device in response to the reception of the second address and the storage access information sent from the remote computing device.

11. The method according to claim 1, further comprising:
    receiving, by the server, a write request to write data to the VHD;
    computing, by the server, a first hash value for the data in response to the write request; and
    searching a hash table for a row with a second hash value matching the first hash value.

12. The method according to claim 11, further comprising:
    if a row is found with a second hash value matching the first hash value,
    updating a hash table row identifier for a row in a page table with a matching VHD version identifier and VHD logical block address to an existing entry, and returning.

13. The method according to claim 11, further comprising:
    if a row is not found with a second hash value matching the first hash value,
    allocating a new data block in one of a plurality of storage objects,
    writing the data to the storage,
    creating a row in the hash table with the hash value, an Addressable Storage Pool identifier and an Addressable Storage Pool offset, and
    updating a row in a page table with a matching VHD version ID and a matching VHD Logical Block Address ("LBA") with a new HTR identifier value.

14. A computing system, comprising:
    a processor; and
    a non-transitory computer-readable storage medium comprising programming instructions that are configured to cause the processor to implement a method for providing thin provisioning virtual machines without thin clone support, wherein the programming instructions comprise instructions to:
    receive a request for accessing Virtual Hard Disk ("VHD") data associated with a first location in a VHD of a plurality of VHDs for a Virtual Machine ("VM") hosted by a remote computing device, the request comprising at least a VHD version identifier and a first address;
    in response to the request, verify that the VM has authority to access information in a relational database;
    in response to a verification that the VM has authority, extract at least the VHD version identifier and the first address from the request, the first address specifying the first location in the VHD,
    use the VHD version identifier to facilitate a translation of the first address into a second address specifying a second location in a storage where the VHD data is stored in a page in the storage, the storage being remote from the computing system and the remote computing device, and
    communicate the second address to the remote computing device for facilitating the remote computing device's access to the VHD data stored in the storage wherein the second location includes stored de-duplicated data in the page for the VHD.

15. The computing system according to claim 14, wherein the programming instructions further comprise instructions to store blocks of the VHD data in the storage.

16. The computing system according to claim 14, wherein the first address comprises a Logical Block Address ("LBA").

17. The computing system according to claim 16, wherein the second address comprises an addressable storage pool identifier and an addressable storage pool offset value.

18. The computing system according to claim 14, wherein the first address is translated into the second address by translating the first address into a row identifier for an entry in a table of a database.

19. The computing system according to claim 18, wherein the database comprises the relational database.

20. The computing system according to claim 18, wherein the first address is translated into the second address by using the row identifier to access the entry of the table which stores a translation from a unique value identifying the VHD data to the second address.

21. The computing system according to claim 20, wherein the unique value comprises a hash value.

22. The computing system according to claim 14, wherein the programming instructions further comprise instructions to use at least a portion of the second address to obtain storage access information required to obtain access to the VHD data stored in the storage.

23. The computing system according to claim 22, wherein the programming instructions further comprise instructions to provide the VHD data to the remote computing device in response to a reception of the second address and the storage access information sent from the remote computing device.

* * * * *